Nov. 7, 1967    T. A. SPENCER    3,350,866
AUTOMATIC LAWN TONGS

Filed Jan. 18, 1965    2 Sheets-Sheet 1

Nov. 7, 1967    T. A. SPENCER    3,350,866
AUTOMATIC LAWN TONGS
Filed Jan. 18, 1965    2 Sheets-Sheet 2

Thomas A. Spencer
INVENTOR 3,350,866
AUTOMATIC LAWN TONGS
Thomas A. Spencer, 337 Manhattan Ave.,
Daytona Beach, Fla. 32018
Filed Jan. 18, 1965, Ser. No. 426,033
2 Claims. (Cl. 56—400.12)

This invention relates to a tool for the ready removal of leaves and other debris from lawns, and is designed to automatically collect and trap such debris (until released) merely by using the tool in the same manner as an ordinary lawn rake, and without first raking such debris into piles, its trapping action being dependent on the interaction between two groups of specially bent tines located respectively on two opposing rake-heads between which the debris is trapped.

The principal object of the invention, which utilizes two cooperating rake-heads, is to provide a tool for automatically collecting and retaining (until emptied) leaves, straw, husks, paper, sticks, grass clippings, rags, toad stools, small branches, and other lawn debris merely by raking a lawn in the usual manner.

Another object of the invention is to provide a tool which can be easily emptied of the collected debris.

Another object of the invention is to provide a tool which will eliminate the need for raking debris into piles.

Another object of the invention is to eliminate any need for stooping by the user both while loading the tool and while emptying it.

Another object of the invention is to provide an automatic lawn tong which is not heavy and which is of particular value for the quick removal from a lawn of random debris, and which will pick up many more types of debris than a sharp-pointed stick.

Another object of the invention is to provide an automatic lawn tong which will be simple and inexpensive to produce.

A further object of the invention is the provision of features which will assure a continuity of satisfactory operation.

Additional objects of the invention will become apparent from a reading of the following specification and claims.

Figure 1:
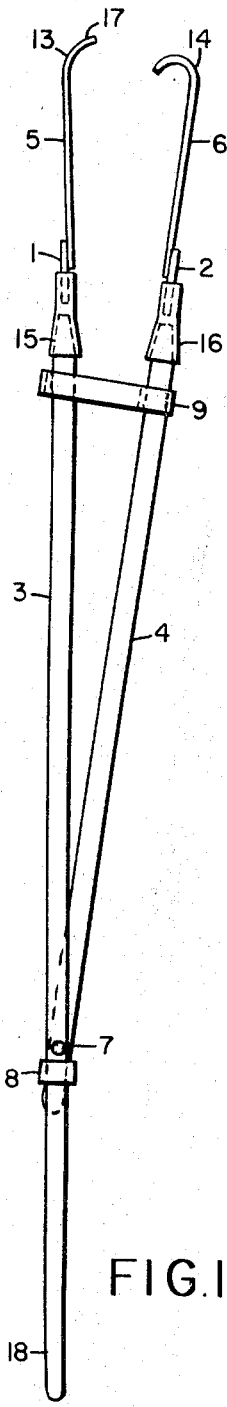
FIGURE 1 is a side view of the tool showing the two cooperating rake-heads separated.
Figure 2:
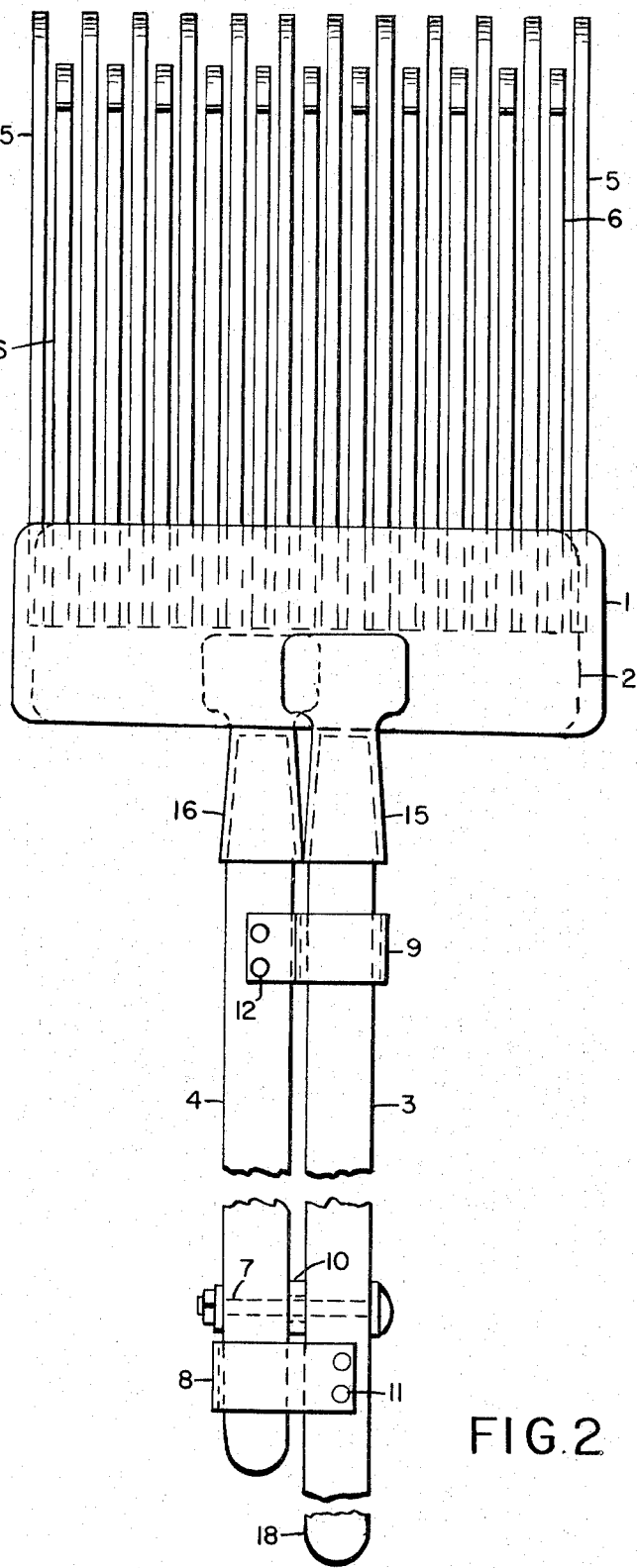
FIGURE 2 is a plan view of the tool drawn to a larger scale than FIG. 1, with portions broken away and omitted.
Figure 3:
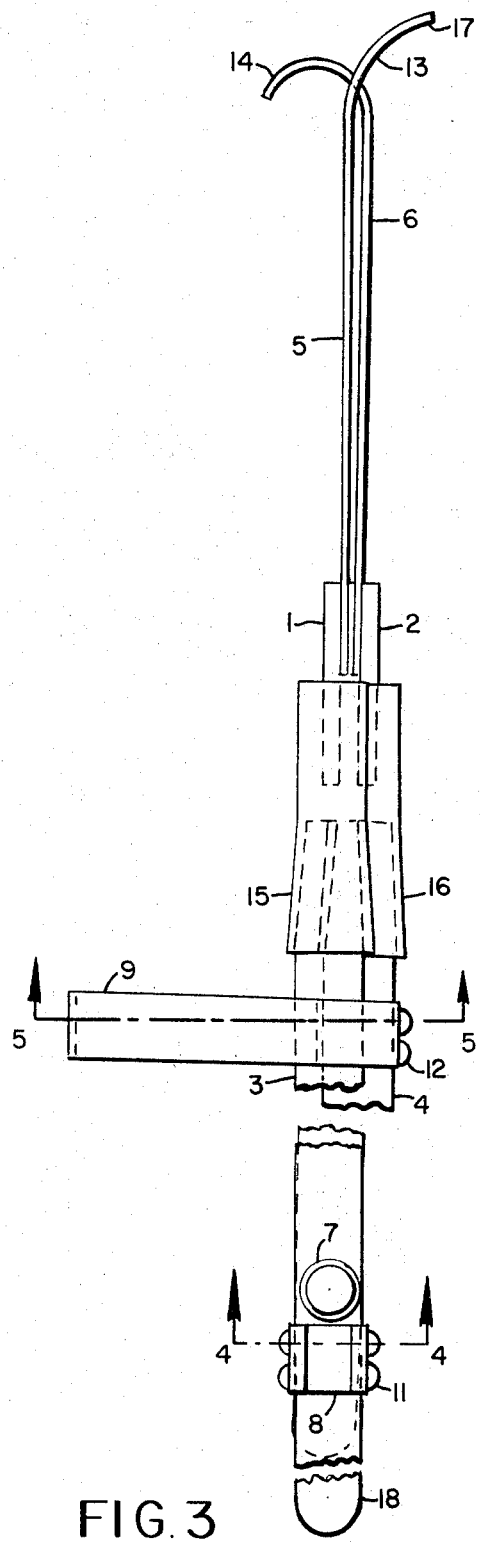
FIGURE 3 is a side view of the tool drawn to a larger scale than FIG. 1, with portions broken away and omitted.
Figure 4:
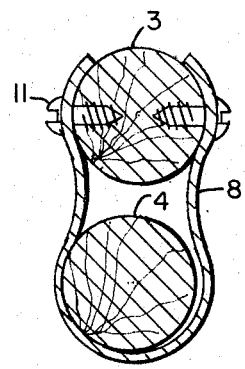
FIGURE 4 is an enlarged sectional view taken on line 4—4 of FIG. 2.
Figure 5:
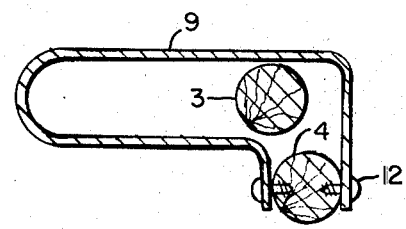
FIGURE 5 is a sectional view taken on line 5—5 of FIG. 2.

The two cooperating rake-heads 1 and 2 are shown in FIGS. 1, 2, and 3. These two rake-heads are associated with each other by means of pivot 7 which connects handle 3 to shaft 4. Normally these two rake-heads with associated tines 5 and 6 are held close together as shown in FIG. 3 by restoring spring 8, but they can be separated as shown in FIG. 1. The tines 5 and 6 are transversely spaced and in the inoperative condition of FIGURE 3 are in adjacent and substantially parallel planes with tines 5 offset from and aligned with the spaces separating tines 6. FIGURE 1 shows the two rake-heads separated as far as alignment facility 9 will permit. Separation of the two rake-heads is necessary for emptying the tool of collected debris, but for this emptying a separation of one-third to one-half of the maximum will ordinarily be adequate.

In their normal inoperative position as shown in FIG. 3, the two rake-heads 1 and 2 and their associated tines 5 and 6 are substantially parallel. Pivot 7 is located a substantial distance from the rake-heads in order to keep the two rake-heads as close to parallel as possible when they are separated. To reduce friction, washer 10 is applied on the pivot between handle 3 and shaft 4.

Restoring spring 8 is made of spring-tempered sheet metal such as Phosphor bronze and is anchored to handle 3 by wood screws 11. It is located near pivot 7 to prevent over-stretching.

Alignment facility 9 is provided to prevent interference between the two sets of tines 5 and 6 which intermesh when rake-heads 1 and 2 to which they are attached come together. This alignment part is made of sheet metal such as aluminum and is anchored to shaft 4 by wood screws 12. The alignment part serves to limit the separation between shaft 4 and handle 3, and in addition its upward protrusion indicates to the user the top side of the tool, this being important as the device would not function if turned upside down.

Shaft 4 protrudes beyond pivot 7 just far enough to permit the application thereto of spring 8, whereas the length of handle 3 conforms with that of the average lawn rake. Protruding end 18 of handle 3 is gripped while the tool is in use.

The free ends of resilient tines 5 and 6 have contrasting bends 13 and 14 respectively, the contours of which are vital in the collection and retention of debris. Bends 13 and 14 conform roughly with the arcs of a circle, with the arc for bend 13 having about twice the radius and one-half the radians of that for bend 14. Both sets of tines are made of spring-temper sheet metal of the same length but the slighter curve of tines 5 results in their being effectively longer than tines 6. This greater length is also vital in the collection of debris, since the tip end 17 of tines 5 contact and lightly scrape the lawn when the tool is being used for collecting debris.

The quantity of tines shown for each rake-head is about one-half of that usually provided in lawn rakes. This is not critical and has been done merely to minimize the weight of this tool.

Referring to FIG. 2, it will be noted that rake-head 1 is shown not centered on handle 3, and rake-head 2 is shown not centered on shaft 4, but that the rake-heads are shown centered with respect to each other. Also, that the quantity of tines 5 is shown as greater by one than that of tines 6. Said centering and difference in tine quantity is not considered essential in the operation of the tool, and involves merely the matter of appearance.

The width and spacing of the tines is not critical, although it appears that the space between the intermeshed tines should be minimized. In a satisfactory working model the tines on each rake-head are 5/16-inch wide with a separation between adjacent tines on the same rake-head of 7/16-inch.

Tapered sockets 15 and 16 are used to join rake-heads 1 and 2 to the tapered ends respectively of handle 3 and shaft 4. No novelty is claimed for the rake-heads and their associated sockets; conventional construction will adequately meet the requirements of this invention.

Lawn debris is collected between the two sets of tines 5 and 6 which along with the associated rake-heads 1 and 2 gradually separate to accommodate the accreting debris collected while raking with the tool.

In use, the rake is grasped by end portion 18 of handle 3, and with tines 5 on top and facing downward, the lawn is raked in the same manner as with an ordinary lawn rake. (The placing of tines 5 on top is indicated by alignment part 9 which protrudes upward when the tool is properly oriented.) The friction of the lawn with the free end tips 17 of tines 5 causes these resilient tines to intermittently and momentarily separate from tines 6. This brief separation is adequate for the trapping of debris between the two sets of tines, and due to the sharp curvature of tines 6, the debris is retained within the space between the tines until the operator empties the tool.

To empty the tool, a right-handed operator would retain his right-hand grip on the end 18 of handle 3, raise the body of the tool with his left hand placed under shaft 4, turn the tool so that rake-heads 1 and 2 are edgewise to the ground, and separate the two rake-heads by gentle pressure between handle 3 and shaft 4 applied by the fingers of his left hand, working against the force of spring 8, whereupon the collected debris would fall out due to its own weight. A left-handed operator would possibly reverse the hand usage just mentioned.

After the tool has been emptied, spring 8 brings rake-heads 1 and 2 back together into the position shown in FIG. 3; this position is also that prevailing while the tool is stored.

Spring 8 serves to facilitate the collection of debris, but for that purpose as well as others only a weak spring is needed. Alignment part 9 functions to prevent interference between intermeshing tines 5 and 6 as rake heads 1 and 2 are brought back together by the spring.

The foregoing is in specific terms and many modifications will suggest themselves. For the true scope of the invention, reference should be made to the appended claims.

I claim:

1. A light and inexpensive automatic lawn tong comprising an upper rake-head provided with a socket at one end thereof, an upper group of about one dozen resilient tines extending from the other end of said upper rake-head, said upper group of tines having a slight curvature at their free ends directed downward, a long straight handle attached to the socket of said upper rake-head; a lower rake-head normally aligned and substantially parallel with the upper rake-head and provided with a socket at one end thereof, a lower group of about one dozen resilient tines extending from the other end of said lower rake-head, said lower group of tines also having a curvature at their free ends but directed upward and which intermesh with the upper group of tines, the curvature of said lower group of tines being appreciably greater than the curvature of said upper group of tines so that the effective length of the lower group of tines is appreciably less than that of the upper group of tines, a short straight shaft attached to the socket of said lower rake-head; pivot means joining said handle and said shaft, said pivot being purposely located at a distance from the rake-heads to provide not only for the normal aligned parallel proximity of the two rake-heads previously mentioned, but also to provide for maintaining a proper relationship between the two rake-heads as they automatically separate while raking, and in addition to provide for the user's convenience in the manual separation of the two rake-heads; a restoring spring means interconnecting the handle and the shaft, said spring being of the wrap-around type made from spring tempered sheet metal, rigidly attached at its two ends to the handle, fitting closely around the shaft, and located near the pivot; and an alignment means of the encompassing type made from sheet metal and rigidly attached at its two ends to the shaft near the rake-head, and providing on its left and right sides a guide for the handle and closed at its top to limit movement.

2. The invention of claim 1, wherein the resilient tines of both the upper and lower groups are made from material of the same thickness, width, and length, and at the same distance from their associated rake-heads each of both sets of tines is bent or formed at its free end into the approximate shape of a circular arc with the arc of the upper tines having about double the radius and one-half the radians of that of the lower tines.

References Cited

UNITED STATES PATENTS 3,164,945   1/1965   Spencer _____ 56—400.12

ABRAHAM G. STONE, *Primary Examiner.*

RUSSELL R. KINSEY, *Examiner.*